United States Patent
Harris et al.

(10) Patent No.: US 11,997,999 B2
(45) Date of Patent: Jun. 4, 2024

(54) 3D ARTICLES AND METHODS OF MAKING SUCH ARTICLES

(71) Applicant: Bushnell Holdings, Inc., Overland Park, KS (US)

(72) Inventors: Herbert J. Harris, Brandon, MS (US); Garrett T. Grey, Brandon, MS (US)

(73) Assignee: Bushnell Holdings, Inc., Overland Park, KS (US)

( * ) Notice: Subject to any disclaimer, the term of this patent is extended or adjusted under 35 U.S.C. 154(b) by 741 days.

(21) Appl. No.: 16/595,651

(22) Filed: Oct. 8, 2019

(65) Prior Publication Data

US 2020/0120921 A1   Apr. 23, 2020

Related U.S. Application Data

(60) Provisional application No. 62/746,890, filed on Oct. 17, 2018.

(51) Int. Cl.
  *B29C 51/10* (2006.01)
  *A01M 31/06* (2006.01)
  *B29C 45/73* (2006.01)

(52) U.S. Cl.
  CPC .............. *A01M 31/06* (2013.01); *B29C 45/73* (2013.01); *B29C 51/10* (2013.01)

(58) Field of Classification Search
  CPC .... B32B 5/18; B32B 5/22; B32B 5/24; B32B 5/245; B32B 5/32; A01M 31/06; B29C 45/73; B29C 51/10; B29L 2031/722
  See application file for complete search history.

(56) References Cited

U.S. PATENT DOCUMENTS

| | | | | |
|---|---|---|---|---|
| 6,115,953 A | * | 9/2000 | Wise | A01M 31/06 43/2 |
| 2009/0080032 A1 | * | 3/2009 | Simons | B29C 33/38 358/450 |

(Continued)

FOREIGN PATENT DOCUMENTS

| | | | |
|---|---|---|---|
| CN | 107848284 A | 3/2018 | |
| DE | 102014003160 A1 | 9/2015 | |
| WO | WO-9309930 A1 * | 5/1993 | ........... B29C 51/145 |

OTHER PUBLICATIONS

First Office Action in related family application CN201910987110.4, issued Apr. 25, 2021; English translation begins on p. 1; Chinese translation begins on p. 15.

(Continued)

*Primary Examiner* — Emmanuel S Luk
*Assistant Examiner* — Debjani Roy
(74) *Attorney, Agent, or Firm* — Reed Smith LLP; Walter M. Egbert, III; Richard J. Brown

(57) ABSTRACT

The present disclosure relates to 3-dimensional (3D) articles with a printed fabric skin that provides an aesthetic appearance to the 3D articles. The printed fabric skin may be a photograph that is printed on a fabric material, which is then applied to a base material to form the 3D article. Registration markers are used to align features of the printed fabric material with corresponding textured features of the 3D body of the article. This provides a light-weight article (such as a decoy) with a 3D shape and texture and image quality printed fabric skin.

22 Claims, 12 Drawing Sheets

(56) References Cited

U.S. PATENT DOCUMENTS

| | | | |
|---|---|---|---|
| 2011/0284537 A1* | 11/2011 | Cerasani | B65D 21/022 |
| | | | 220/694 |
| 2015/0158642 A1* | 6/2015 | Montemarano | B65D 51/245 |
| | | | 220/376 |
| 2018/0117875 A1* | 5/2018 | Berzins | B32B 25/045 |
| 2020/0086597 A1* | 3/2020 | Jessiman | A43B 13/188 |

OTHER PUBLICATIONS

Second Office Action in related family application CN201910987110. 4, issued Jan. 12, 2022; English translation begins on p. 1; Chinese translation begins on p. 15.
Rejection Decision in related family application CN201910987110. 4, issued Jun. 22, 2022; English translation begins on p. 1; Chinese translation begins on p. 12.

* cited by examiner

3D ARTICLES AND METHODS OF MAKING SUCH ARTICLES

CROSS-REFERENCES TO RELATED APPLICATIONS

The present application claims the benefit of and priority to U.S. Provisional Patent Application No. 62/746,890, filed on Oct. 17, 2018, entitled 3D Articles and Methods of Making Such Articles, the contents of which are incorporated by reference herein in their entirety.

FIELD

The present disclosure generally relates to 3D articles, and more particularly, to improved 3D articles and methods of making the 3D articles.

BACKGROUND

Typically, articles, such as hunting and other types of decoys are 2-dimensional (2D) or 3-dimensional (3D) and manufactured out of a flexible or rigid material. Some 2D articles may be fabricated to include a printed fabric skin or layer. However, these articles are 2D, meaning that there is no texture to the body of the article. Some 3D articles include a textured, flexible or rigid body. However, the textured body is then painted to provide the color and desired aesthetic appearance. Such painted articles are largely inflexible. Also they may degrade with exposure and handling and use so the details and efficacy are lost.

SUMMARY

In general, the present disclosure relates to 3-dimensional (3D) articles with a printed fabric skin that provides realistic detail and aesthetic appearance to the 3D articles. The printed fabric skin may be a photograph that is printed on a fabric material, which is then applied to a base material to form the 3D article. Registration markers are used to align features of the printed fabric material with corresponding textured features of the 3D body of the article. The body may be a lightweight, foldable thermoformed foam that is flexible and compressible. This provides a foldable, light-weight article (such as a decoy) with a 3D shape and texture and image quality printed fabric skin that is durable.

In an embodiment, the present disclosure relates to a method of making a 3D article. The method includes coupling a printed fabric to a base material, applying first registration markers to the printed fabric, aligning the first registration markers with corresponding second registration markers of a mold, and forming the 3D article using the mold. The 3D article may be thermoformed using compression or vacuum thermoforming processes.

In an embodiment, the present disclosure relates to a method of making a 3D article. The method includes applying first registration markers to a printed fabric, aligning the first registration markers with corresponding second registration markers of a mold, applying an adhesive to one or more of the printed fabric and a base material, heating the base material, and pressing or pulling the base material into the mold with the printed fabric in the mold, to form the 3D article.

In an embodiment, the present disclosure relates to an article. The article includes a base material having textured surface features, and a printed fabric coupled to the base material and having printed surface features that are aligned with the textured surface features to form a 3D article. In an example, the 3D article is a decoy, such as a turkey decoy.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which.

DETAILED DESCRIPTION

Detailed embodiments of devices, systems, and methods are disclosed herein, however, it is to be understood that the disclosed embodiments are merely exemplary of the devices, systems, and methods, which may be embodied in various forms. Therefore, specific functional details disclosed herein are not to be interpreted as limiting, but merely as a basis for the claims and as a representative basis for teaching one skilled in the art to variously employ the present disclosure.

In general, the present disclosure relates to 3-dimensional (3D) articles with a printed fabric skin that provides an aesthetic appearance to the 3D articles. The printed fabric skin may be a photograph that is printed on a fabric material, which is then applied to a base material to form the 3D article. Registration markers are used to align features of the printed fabric material with corresponding textured features of the 3D body of the article. The 3D article may be constructed of a thermoformed foam. This provides a lightweight, foldable article (such as a decoy) with a 3D shape and texture and image quality printed fabric skin that is durable.

In an example, the 3D article may be a turkey decoy with a body made of thermoformed foam that is laminated with a printed fabric of an actual photograph of a turkey. Thermoforming allows for the 3D shape, including textured detail of feathers and lines of the body. The printed image of the actual photograph of the turkey, in this illustrative embodiment, is aligned with the 3D form or mold to provide correct alignment between the printed image on the fabric with the textured feather and body line details of the turkey. A head of the decoy may be attached after forming of the 3D body and can be a blow molded, injection molded, or rotomolded/rotational molded head that is painted to match the 3D body. The body and other parts of the decoy may be assembled via sewing, gluing, etc.

Figure 1:
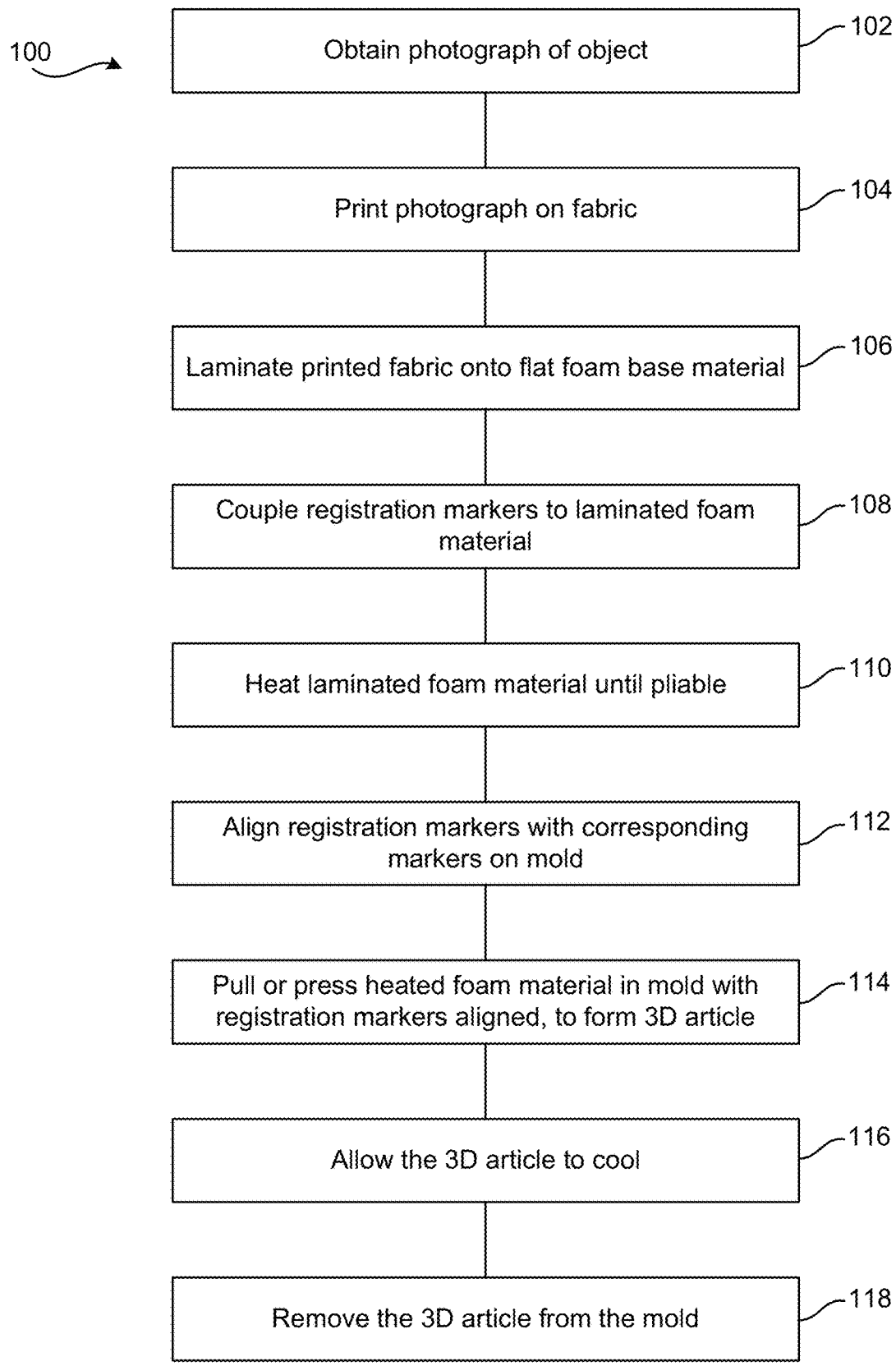
FIG. 1 illustrates a flow diagram of a method according to embodiments of the disclosure.

A method 100 of making a 3D article (such as a decoy or other 3D article) according to the present disclosure is described with reference to FIG. 1. At step 102, a photograph of an object is obtained. The photograph may be obtained by taking or otherwise obtaining a photograph of the object taken with a camera, or other image capture device or image generation device (such as 3D Computer Aided Design or Computer Graphic Imaging device). For example, with reference to the example described herein of a turkey decoy, a photograph of a live turkey, taxidermy turkey, or other life-like turkey may be taken. Once the photograph is obtained, the photograph may be printed on a fabric material, at step 104. This may include manipulating the photograph from a 3D image to a 2D image using known techniques. Further, it should be appreciated that the term "fabric" has a broad meaning and encompasses not just woven materials but also other flexible sheet materials such as polyvinyl, plastic, or other sheeting material(s). The fabric may also be a bleached or non-bleached material. In the case of a decoy, the fabric is preferably non-bleached material. This is because certain game animals, such as turkeys, can see UV light (such as UVA light). In UVA light, phosphors (which can be found in bleached fabric) can glow, which can cause the game animal to be deterred, rather than attracted.

At step 106, the printed fabric may be laminated onto a flat base material. The base material may be a flexible or rigid material, such as a foam material. For example, the foam material may be an Ethylene-Vinyl Acetate (EVA) close cell foam, or other type of thermoplastic material that is capable of being thermoformed. Registration markers are applied to the laminated material, at step 108. The registration markers may alternatively be applied to the fabric during the printing step as the photograph is printed onto the fabric in step 104 above, or to the printed fabric before it is laminated onto the base material. Corresponding registration markers may also be applied to a mold for the 3D article. The registration markers on the laminated material or fabric and the mold provide alignment markers that ensure the printed features on the laminated material align properly with the textured 3D features on the mold.

One or more registration markers may be applied to the fabric during printing, to the printed fabric after printing, and/or the laminated material. The registration markers may be applied to an area that will be part of the final article, and/or applied to edges of the fabric during printing, the printed fabric after printing, and/or the laminated material that will eventually be removed.

In an example, one or more apertures or coupling features may be applied to the printed fabric and/or the laminated material along edges of the printed fabric and/or the laminated material that will be removed. These apertures or coupling features may be positioned using a stencil. For example, a stencil may be disposed on the printed fabric and/or the laminated, and marks/apertures may be made in positions indicated by the stencil. These apertures or coupling features may receive or mate with corresponding features, such as pins, on an edge of the mold to hold the printed fabric and/or the laminated material in alignment with the mold while the laminated material is pulled or pressed into the mold. In another example, one or more pins may be applied to the printed fabric and/or the laminated material. These pins may then mate with corresponding features (such as mating pins, recesses, and/or apertures) of the mold when the laminated material is pulled or pressed into the mold. The pins may then be removed after the laminated material is formed in the mold.

During the printing of the fabric, one or more registration markers may also be printed onto the fabric. These printed registration markers may be used to align the laminated material with the corresponding registration markers of the mold. The printed registration markers may also identify locations where pins, recesses, apertures, and/or other coupling features may be applied to the printed fabric and/or the laminated material. One or more of the registration markers (printed or otherwise) may be in a location where additional components are coupled or applied to the 3D article to form the finished 3D article. For example, a registration marker may be located where a stake or stand may be coupled to the 3D article.

At step 110, the laminated material is heated until the laminated material is pliable. At step 112, the registration markers on the laminated material and corresponding registration markers on the mold are aligned with each other. As mentioned above, this alignment is used to ensure the printed features on the laminated material align properly with the textured 3D features on the mold. The alignment of the registration markers may be performed by hand or by automated machine. For example, a manufacturer may physically look at the registration markers on the laminated material and corresponding registration markers on the mold, and position the laminated material into alignment with the mold. Alternatively, a computerized machine may be programmed to recognize the registration markers and position the laminated material to align the registration markers on the laminated material with the corresponding registration markers on the mold in an automated process.

At step 114, the heated laminated material is pulled or pressed into the mold, with the registration markers on the laminated material aligned with the corresponding registration markers on the mold to form the 3D article. In one example, the heated laminated material is pulled into the mold (which is a female mold) via a vacuum. In another example, the heated laminated material is pressed into the female mold using a male mold that corresponds to the female mold.

The 3D article is allowed to cool, at step 116, and the 3D article is removed from the mold, at step 118. In some embodiments, the 3D article may be finalized by cutting (for example, using a die cutting machine or other machine) or otherwise removing excess material to form the 3D article. The 3D article may be the entire article to be manufactured or may be part of an article to be assembled with one or more additional components to form a finished 3D article. For example, using the turkey decoy example, the 3D article may be a clamshell type article to be assembled with another clamshell type article, a stake or stand, and a head to form the finished 3D article.

Figure 2:
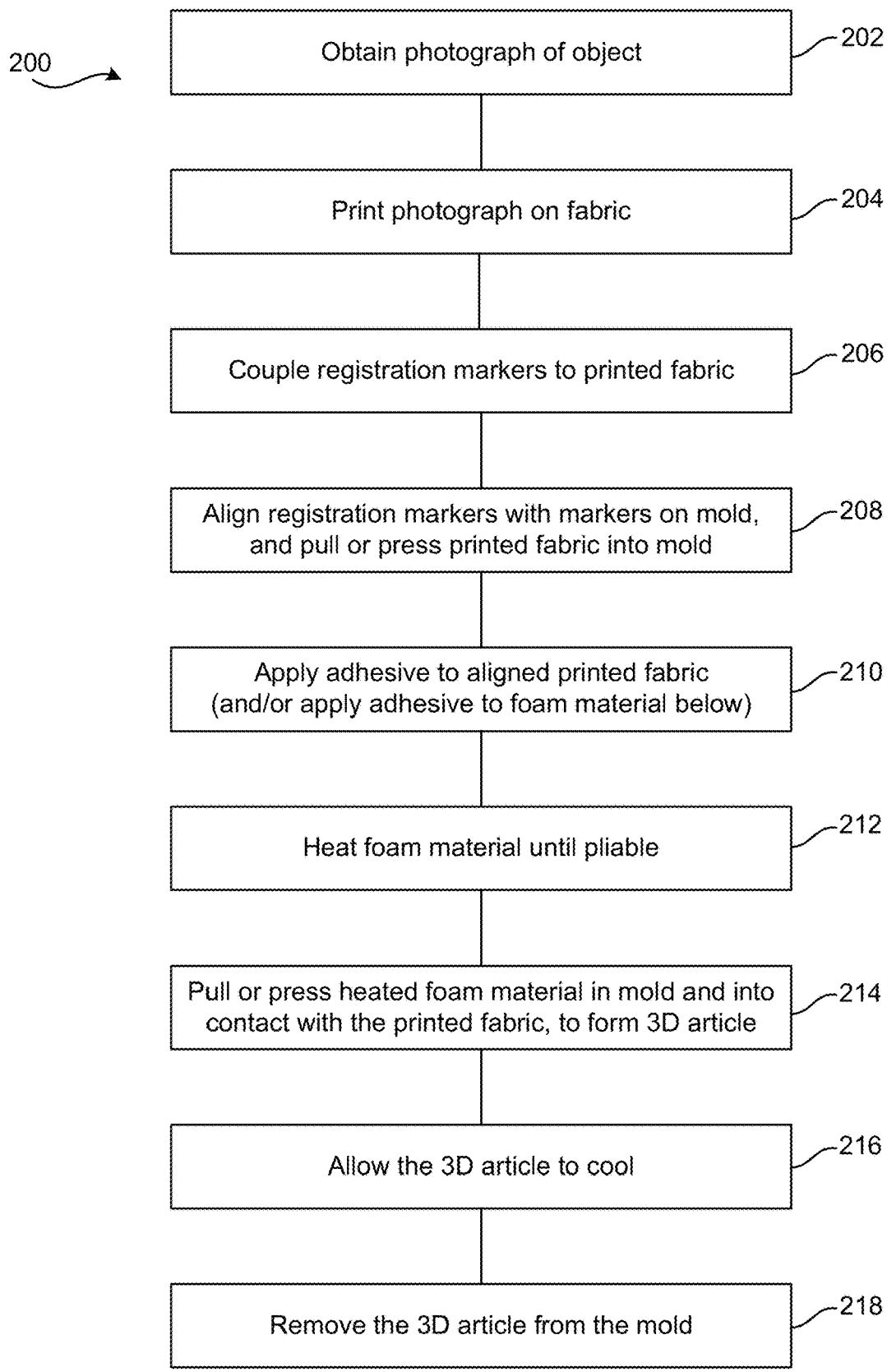
FIG. 2 illustrates a flow diagram of another method according to embodiments of the disclosure.

Another method 200 of making a 3D article (such as a decoy or other 3D article) according to the present disclosure is described with reference to FIG. 2. At step 202, a photograph or other image of an object is obtained. The photograph may be obtained by taking or otherwise obtaining a photograph of the object taken with a camera, or other image capture or image generation device (such as 3D Computer Aided Design or Computer Graphic Imaging device). For example, with reference to the example described herein of a turkey decoy, a photograph of a live turkey, taxidermy turkey, or other life like turkey may be taken. Once the photograph is obtained, the photograph may be printed on a fabric material, at step 204. As described above, This may include manipulating the photograph from a 3D image to a 2D image using known techniques.

Registration markers are applied to the printed fabric material, at step 206. As described above, the one or more registration markers may be applied to the fabric during printing, to the printed fabric after printing, and/or the laminated material. Corresponding registration markers may also be applied to a mold for the 3D article. The registration markers on the printed fabric material and mold provide alignment markers that ensure the printed features on the printed fabric material align properly with the textured 3D features on the mold. At step 208, the registration markers on the printed fabric material and corresponding registration markers on the mold are aligned with each other. Additionally, at step 208, the printed fabric material with the registration markers is pressed or pulled (for example, via vacuum) into the mold, with the registration markers aligned. As described above, this alignment is used to ensure the printed features on the printed fabric material align properly with the textured 3D features on the mold. The alignment of the registration markers may also be performed by hand or by automated machine, as described above.

Further, as described above, one or more registration markers may be applied to the fabric during printing and/or the printed fabric after printing in an area that will be part of the final article, an area where additional components are coupled or applied to the 3D article to form the finished 3D article, and/or applied to edges that will eventually be removed. As described above, the registration markers may be one or more pins, recesses, apertures, and/or other coupling features, and/or printed registration markers that identify locations where one or more pins, recesses, apertures, and/or other coupling features may be applied. Further, the registration markers may be applied using a stencil.

An adhesive may be applied to an interior of the printed fabric and/or applied to a base material, at step 210. As described above, the base material may be a flexible or rigid material, such as a foam material. For example, the foam material may be an Ethylene-Vinyl Acetate (EVA) close cell foam, or other type of thermoplastic material that is capable of being thermoformed.

At step 212, the base material is heated until the base material is pliable. At step 214, the heated base material is pulled or pressed into the mold, to cause the base material and printed fabric to contact the adhesive, which couples the base material and printed fabric together. The printed fabric material may be held in place to ensure the registration markers on the printed fabric material remain aligned with the corresponding registration markers on the mold. As described above, the heated base material may be pulled into the mold (which is a female mold) via a vacuum, and/or pressed into the female mold using a male mold that corresponds to the female mold.

The 3D article is allowed to cool, at step 216, and the 3D article is removed from the mold, at step 218. As described above, the 3D article may be finalized by cutting or otherwise removing excess material to form the 3D article. The 3D article may be the entire article to be manufactured or may be part of an article to be assembled with one or more additional components to form a finished 3D article.

It should be appreciated that one or more steps of the methods 100 and 200 may be combined, substituted, and/or modified with each other to form an alternate method. For example, instead of laminating the printed fabric on a flat base material, as in the method 100, the printed fabric may be applied to a formed 3D base material using an adhesive, while still using registration markers to properly align the printed fabric with the features of the 3D base material.

In an example, the finished 3D article to be manufactured is a turkey decoy. The decoy includes a clamshell type body formed by coupling first and second portions together. Each of the first and second portions having a base material having textured surface features, and a printed fabric coupled to the base material, wherein the printed fabric includes printed surface features that are aligned with the textured surface features.

Figure 3:
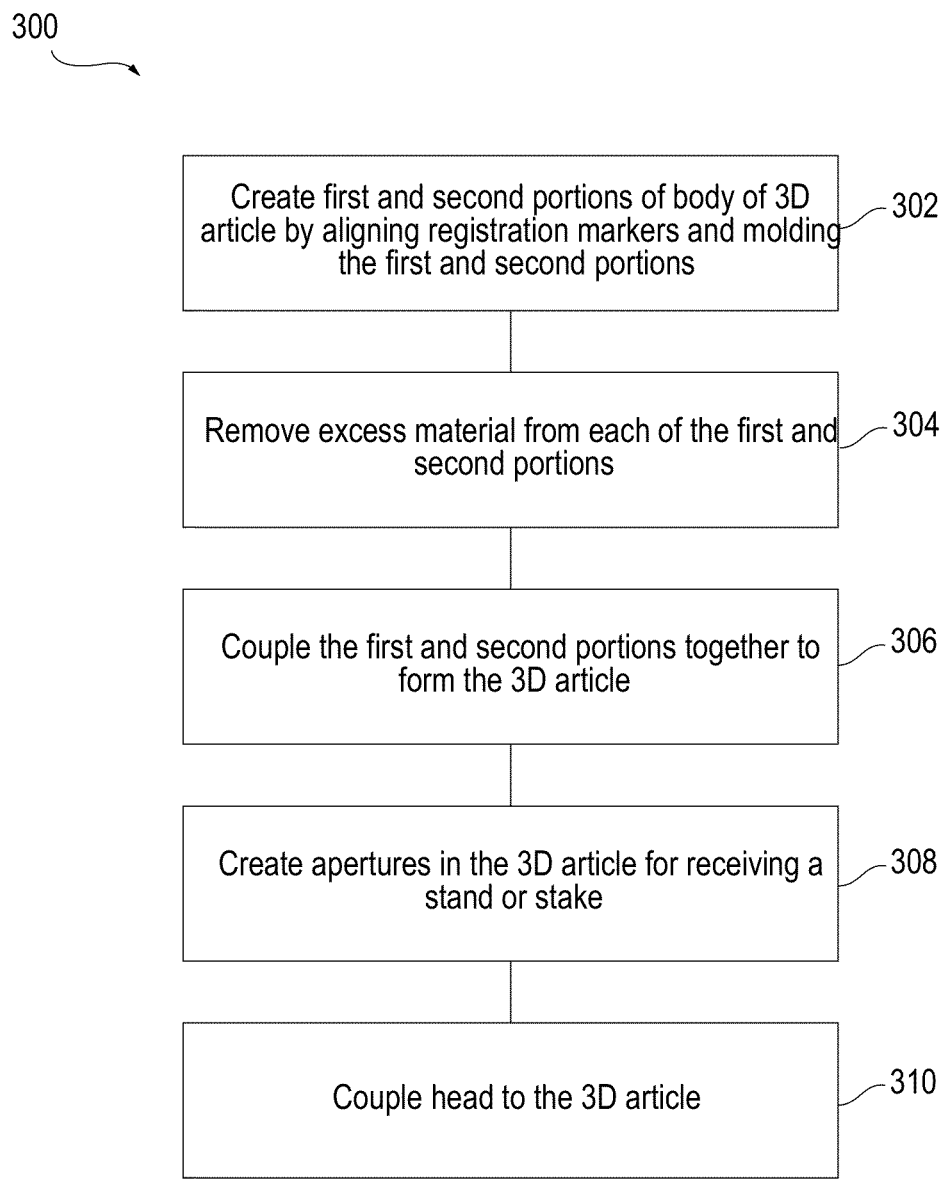
FIG. 3 illustrates a flow diagram of a method of producing a decoy according to embodiments of the disclosure.
Figure 4:
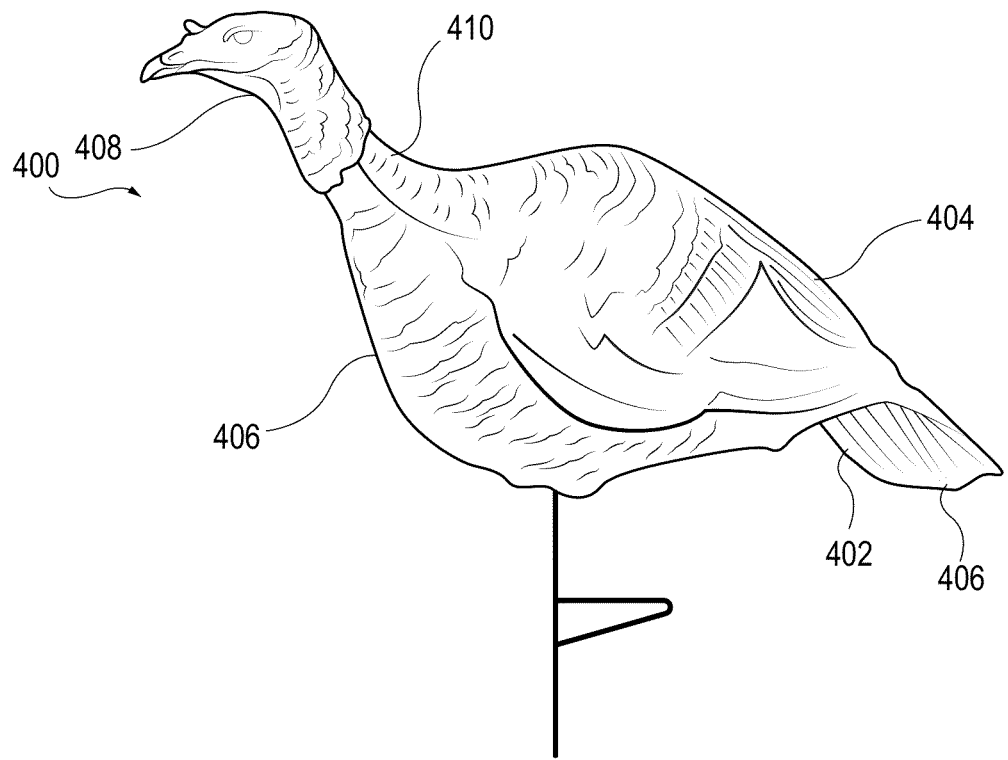
FIG. 4 illustrates a perspective view of a 3D article with a printed fabric skin according to embodiments of the disclosure.
Figure 5:
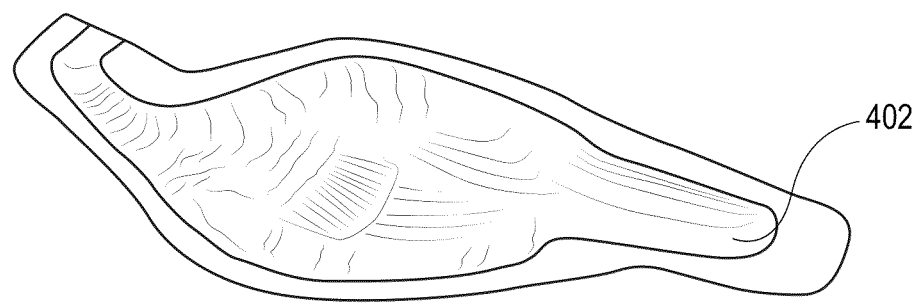
FIG. 5 illustrates a perspective view of a first half of a clamshell design of the 3D article according to embodiments of the disclosure.

Referring to FIG. 3, a method 300 of producing the decoy is described. At step 302, first and second portions of the body of the 3D article (decoy) are created by aligning registration markers and molding the first and second portions. The first and second portions may be formed using one or more of the techniques and/or methods described herein, for example, using methods 100 and/or 200 to form first and second portions that each have a base material and a printed fabric coupled to the base material, wherein the printed fabric includes printed surface features that are aligned with textured surface features. As described above, the printed fabric is preferably a non-bleached material. This is because certain game animals, such as turkeys, can see UV light (such as UVA light). In UVA light, phosphors (which can be found in bleached fabric) can glow, which can cause the game animal to be deterred, rather than attracted.

As described above, one or more registration markers may be applied to the fabric during printing, to the printed fabric after printing, and/or the laminated material. The registration markers may be applied to an area that will be part of the final article, and/or applied to edges of the fabric during printing, the printed fabric after printing, and/or the laminated material that will eventually be removed.

In an example, one or more pins may be applied to the printed fabric and/or the laminated material. These pins may then mate with corresponding features (such as mating pins, recesses, and/or apertures) of the mold when the laminated material is pulled or pressed into the mold. In another example, one or more apertures or coupling features may be applied (for example, using a stencil) to the printed fabric and/or the laminated material along edges of the printed fabric and/or the laminated material that will be removed. Further, during the printing of the fabric, one or more registration markers may be printed onto the fabric. These printed registration markers may be used to align the laminated material with the corresponding registration markers of the mold. The printed registration markers may also identify locations where pins, recesses, apertures, and/or other coupling features may be applied to the printed fabric and/or the laminated material. One or more of the registration markers (printed or otherwise) may be in a location where additional components are coupled or applied to the 3D article (decoy) to form the finished 3D article. For example, a registration marker may be located where a stake or stand may be coupled to the 3D article (decoy).

At step 304, excess material is removed from each of the first and second portions. The excess material may be removed by cutting (for example, using a die cutting machine or other machine) or otherwise removing the excess material. In an example, excess material may be removed by die cutting underneath a tail portion of the first and second portions of the decoy.

At step 306, the first and second portions are coupled together. The first and second portions may be coupled together by aligning edges of the first and second portions with each other and coupling the first and second portions together, for example, using sewing or stitching, adhesive, an openable and closeable mechanism, or a combination thereof. In an example, the first and second portions are coupled together by stitching the edges of the first and second portions together, with the raw edges inside or internal to the decoy. The first and second portions may be stitched together along the all or a portion of the edges. In an example, the first and second portions may be stitched together along a top or neck and back portion of the decoy, along a top of a tail portion, and down towards a bottom or belly portion of the decoy; and along a bottom portion of the neck portion towards a bottom or breast/belly portion of the decoy. A remainder of the bottom or breast/belly portion of the decoy may be coupled together with an openable and closeable mechanism (such as a zipper, for example).

At step 308 one or more apertures or holes may be created in the 3D article (decoy) to accommodate a stake or stand. In an example, the stake or stand may have a "Y" shape, and the top ends of the "Y" shape may be inserted into or coupled to the 3D article (decoy) via the corresponding apertures. An eyelet or grommet may also be placed in the apertures, that receive the ends of the stake or stand. The eyelet or grommet may also provide a friction type fit with the stand.

At step 310, a head is coupled to the neck portion of the 3D article (decoy). The head may be rotomolded, blow molded, or injection molded, and painted to match the body of the 3D article (decoy). For example, a carving of a head may be made or a freeze dried head may be used to make a head mold. The head may then be rotomolded, blow molded, or injection molded using the head mold. An insert may also be used to couple the head to the body and hold the head in a desired position. For example, an insert may be coupled to the body, at the neck portion, and extend out of the neck portion. The head may then be disposed on and coupled to the insert.

As described above, in an example, the finished 3D article to be manufactured is a turkey decoy. A turkey decoy 400 according to the present disclosure is described with reference to FIGS. 4-9. The decoy 400 includes a body having a base material having textured surface features, and a printed fabric coupled to the base material, wherein the printed fabric includes printed surface features that are aligned with the textured surface features. The body of the decoy 400 may be formed using one or more of the techniques and/or methods described above.

As illustrated, the decoy 400 is a clamshell type design having a first portion 402 and a second portion 404 that are coupled together. Each of the first portion 402 and the second portion 404 may include a printed fabric skin, and formed using one or more of the techniques and/or methods described above. For example, the first portion 402 (illustrated in FIG. 5 without excess material removed) may be formed as a first half of the decoy 400, using a single female mold (such as mold 700 illustrated in FIG. 10) or both male and female corresponding molds for the first portion, as described above. The second portion 404 may be similarly formed as a second half of the decoy 400 using a single female mold (such as mold 600 illustrated in FIG. 10) or both male and female corresponding molds for the second portion, as described above.

Figure 10:
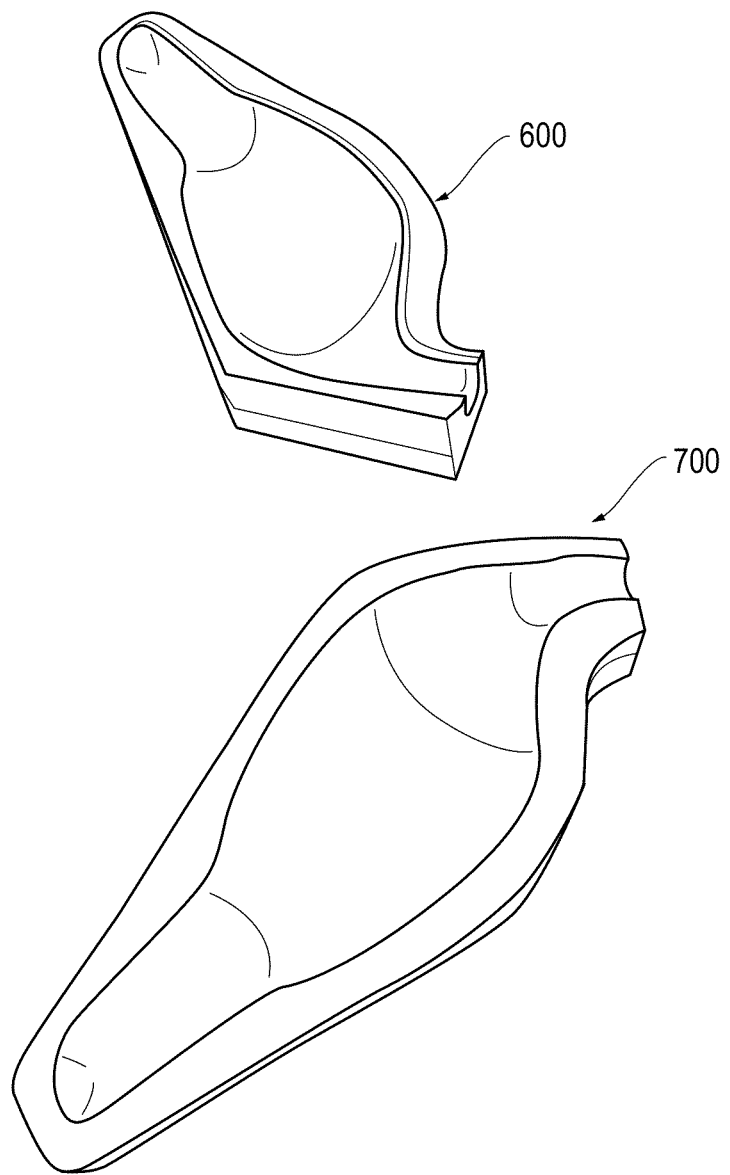
FIG. 10 illustrates 3D article molds according to embodiments of the disclosure.

Referring to FIG. 10, the molds 600 and 700 may each be formed using a 3D carving of the turkey decoy. For example, a carving may be created for the first and second portions and be used to cast the molds 600 and 700, using known techniques.

While the first and second portions 402 and 404 and the molds 600 and 700 are illustrated as halves of the turkey, split along a back of the turkey. The first and second portions and corresponding molds may be of halves of the turkey split along any other plane or section, such as a plane extending through a side of the turkey, diagonally through the body of the turkey, etc.

Referring back to FIGS. 4-9, using the methods described above, the printed fabric and the textured surface features of the feathers and other body lines of the body are aligned to provide an aesthetically realistic looking turkey decoy 400.

Figure 6:
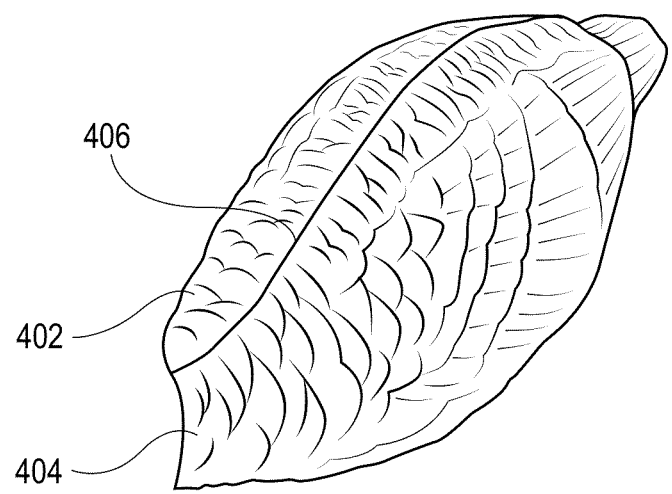
FIG. 6 illustrates a perspective view of a top (or back) of the 3D article illustrated in FIG. 4.
Figure 7:
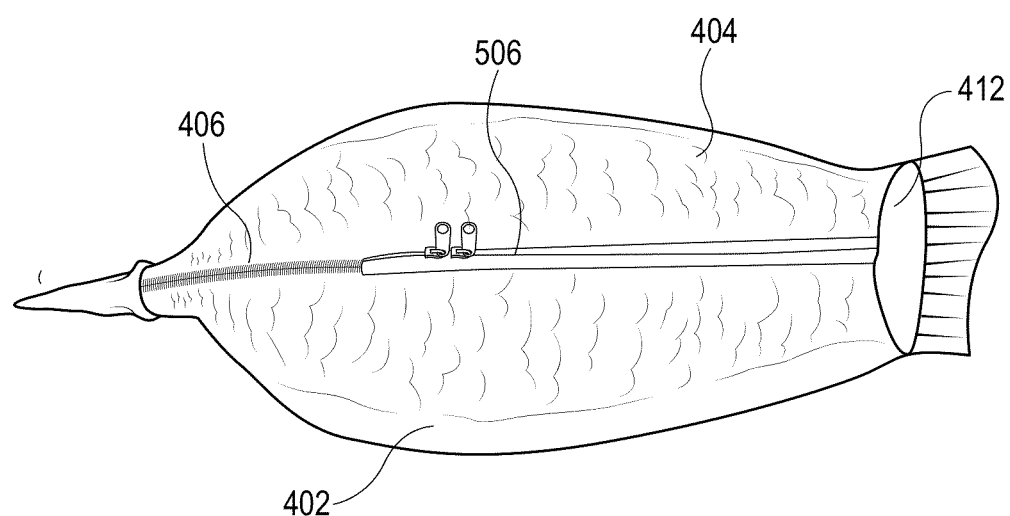
FIG. 7 illustrates a perspective view of a bottom (or underside) of the 3D article illustrated in FIG. 4.

The first portion 402 and the second portion 404 may be coupled together using various methods, for example, sewing or stitching, adhesive, or an openable and closeable mechanism. Example openable and closeable mechanisms include a zipper, buttons, snaps, hook and loop (Velcro®), etc. A seam 406 may be formed at a portion where the first portion 402 and the second portion 404 are coupled together. As illustrated in FIGS. 6 and 7, the seam 406 extends around the first portion 402 and the second portion 404, and may include a zipper type openable and closable mechanism 506.

However, the first portion 402 and the second portion 404 may be formed as an integral or single monolith piece. For example, the first portion 402 and the second portion 404 may be formed at a same time with a single female mold that includes both portions spread open in a butterfly type fashion. In such a mold, the first portion 402 and the second portion 404 may be connected along a back of the decoy (i.e., a back of the turkey), a bottom of the decoy (i.e., a belly or underside of the turkey), a lateral line along a side of the decoy, or other area of sectioning of the decoy. In these example, the seam may only extend along a portion of the decoy to couple the first portion and the second portion together.

The first and second portions 402 and 404 may be coupled together by aligning edges of the first and second portions 402 and 404 with each other and coupling the first and second portions 402 and 404 together, for example, using sewing or stitching forming the seam 406. In an example, the first and second portions 402 and 404 are coupled together by stitching the edges of the first and second portions 402 and 404 together, with the raw edges inside or internal to the decoy 400. The first and second portions 402 and 404 may be stitched together along all or a portion of the edges. In an example, the first and second portions 402 and 404 may be stitched together along a top or neck and back portion of the decoy 400, along a top of a tail portion, and along a bottom portion of the neck portion towards a bottom or breast/belly portion of the decoy 400, as illustrated in FIGS. 6 and 7.

Referring to FIG. 6, the decoy 400 may also include an aperture 412 in an area where the first portion 402 and the second portion 404 are not coupled together. For example, the tail portion of the decoy 400 may be cut out on an underside of the tail portion, so there is only a single layer of material forming the tail. This provides a more realistic look to the tail. Edges of the tail may be coated with a polymer, adhesive, etc. to prevent fraying, damage, and separation of the layers of the tail. The aperture 412 may also allow decoy 400 to catch wind and add movement to the decoy 400 during use.

A portion of the coupling between the first portion 402 and the second portion 404 may be openable and closeable, for example, via a zipper, buttons, snaps, hook and loop (Velcro®), etc. As illustrated in FIG. 7, the openable and closable mechanism 506 may be located on a bottom of the decoy 400, so as to be less visible when the decoy 400 is in use. However, openable and closable mechanism 506 may be located on any portion of the decoy 400, as desired. Further, the openable and closable mechanism 506 may be about 10 to about 12 inches long; however, the openable and closable mechanism 506 may be smaller or larger than about 10 to about 12 inches, as desired.

In an aspect, the decoy 400 is collapsible or crushable, as a result of using a flexible base material to make the decoy 400. This allows a user to fold, or otherwise collapse the decoy 400 for transport to and from an area of use. The aperture 412 or openable and closeable mechanism 506 allows air to enter and exit an interior of the decoy 400 to allow the decoy 400 to be collapsible or crushable, for example to store the decoy in compressed fashion into a pack. The aperture 412 or openable and closeable mechanism 506 may also allow a user to insert the user's hand or other object into the interior of the decoy 400 to push an interior of the decoy 400 outward after the decoy 400 has been collapsed or crushed, in order to return the decoy to its uncompressed shape. A hollow interior of the decoy 400 may also allow a user to store one or more items in the decoy 400 for transport to and from an area of use or for storage.

Figure 8:
FIG. 8 illustrates a first perspective view of a head for a 3D article according to embodiments of the disclosure.
Figure 9:
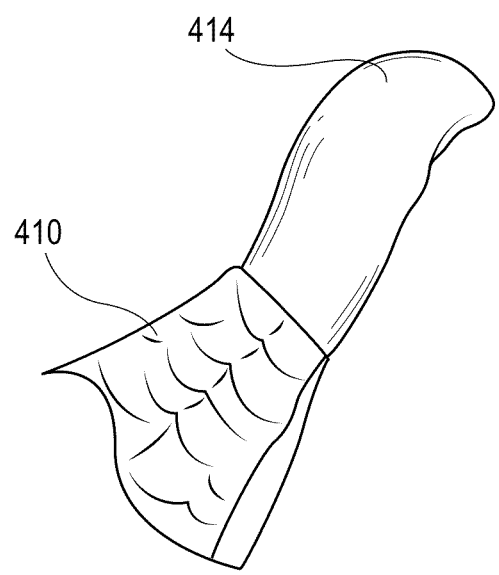
FIG. 9 illustrates a perspective view of a neck portion of the 3D article according to embodiments of the disclosure.

Referring to FIGS. 8 and 9, the decoy 400 also includes a head 408 that is coupled to a neck portion 410 of the decoy 400. As illustrated, the neck portion 410 is formed by both of the first portion 402 and the second portion 404. The head 408 may be coupled post forming of the 3D body of the decoy 400 and may be a rotomolded, blow molded, or injection molded. The head 408 may also be painted to match the 3D body of the decoy 400. The head 408 may be non-removably or removably coupled to the neck portion 410. For example, the head 408 may be coupled directly to the neck portion 410 using various methods, for example, sewing, adhesive, or reversible coupling mechanism. Example, reversible coupling mechanisms include a zipper, buttons, snaps, hook and loop (Velcro®), etc. Further, it should also be appreciated, that the head 408 may be formed using any of various known methods and may be integral to the body of the decoy 400, or separate therefrom.

The head 408 may also be coupled to the decoy 400 by an insert 414. The insert 414 may be non-removably or removably coupled to the neck portion 410. For example, a first end of the insert 414 may be coupled directly to the neck portion 410 using various methods, for example, sewing, adhesive, or reversible coupling mechanism. The head 408 may then be non-removably or removably coupled to a second end of the insert 414, opposite the first end. For example, the head 408 may include a recess that receives the second end of the insert 414, and the head 408 may be coupled to the insert using various methods, for example, sewing, adhesive, or reversible coupling mechanism. The insert 414 may assist in holding the head 408 in a desired position.

Figure 11:
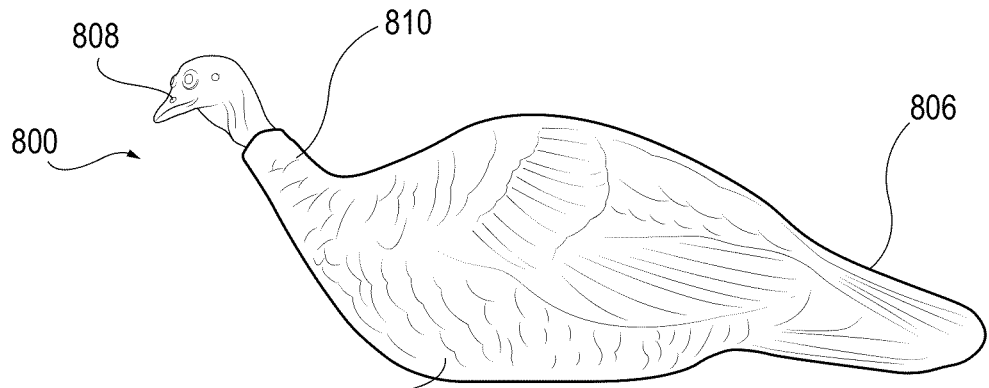
FIGS. 11-13 illustrate perspective views of another 3D article with a printed fabric skin according to embodiments of the disclosure.
Figure 12:
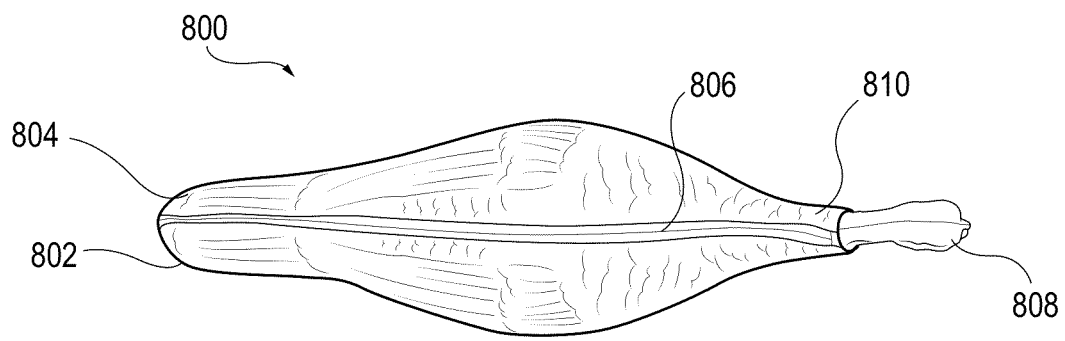
Figure 13:
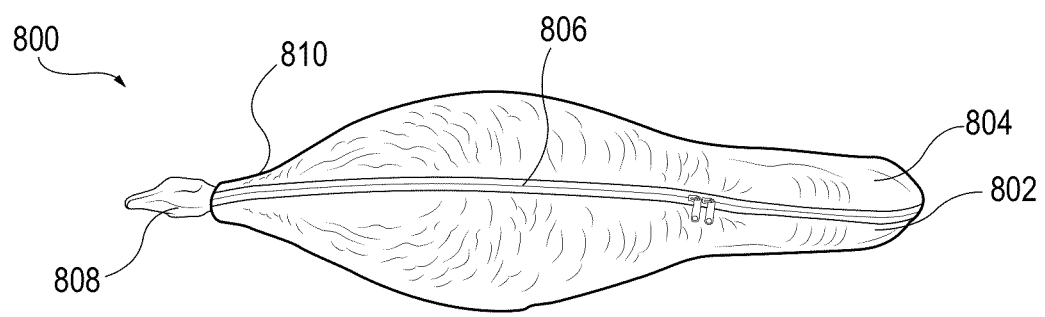

In another example, the decoy may provide a fully enclosed body, without the tail portion and aperture 412 formed but cut out areas. For example, referring to FIGS. 11-13, a decoy 800 may be formed by a first portion 802 and a second portion 804 may be coupled together using various methods, for example, sewing or stitching, adhesive, or an openable and closeable mechanism. A seam 806 may be formed at a portion where the first portion 802 and the second portion 804 are coupled together. As illustrated in FIGS. 11-13, the seam 806 extends around the first portion 802 and the second portion 804, and may include a zipper type openable and closable mechanism, along all or a portion of the seam. The decoy 800 also includes a head 808 that is coupled to a neck portion 810 of the decoy 800.

The openable and closeable mechanism may allow a user to insert the user's hand or other object into the interior of the decoy 800 to push an interior of the decoy 800 outward after the decoy 800 has been collapsed or crushed, in order to return the decoy to its uncompressed shape. A hollow interior of the decoy 800 may also allow a user to store one or more items in the decoy 800 for transport to and from an area of use or for storage. Further, The decoy 800, may include one or more of the features described above with reference to the decoy 400.

Figure 14:
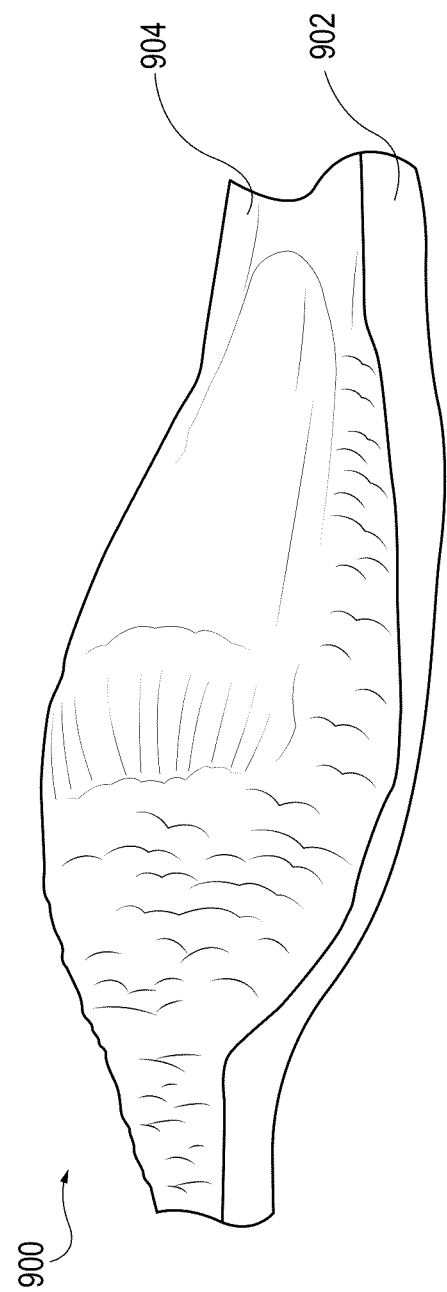
FIG. 14 illustrates a perspective views of another 3D article with a printed fabric skin according to embodiments of the disclosure.

An example of a decoy 900 in which the first portion and the second portion are connected along a back of the decoy (i.e., a back of the turkey) is illustrated in FIG. 14. The first portion 902 and the second portion 904 may then be folded or aligned and coupled together. The decoy 900 may be formed using a butterfly type mold, as described above, or a single female mold that includes a single recess with a bottom of the decoy providing an opening to the recess. The decoy 900, may include one or more of the features described above with reference to the decoy 400 and/or 800. For example, the decoy 900 may include an aperture or openable and closeable portion, a head, etc.

The decoys 400/800/900 may also include a stand or stake that can be removably coupled to a bottom of the decoy 400/800/900. The stake may be in the form of a "Y" shape, where the top ends of the "Y" shape may be inserted into corresponding apertures in the decoy 400/800/900, or coupled to the decoy via fasteners. An eyelet or grommet may also be placed in the apertures that receive the ends of the stake or stand. The eyelet or grommet may also provide a friction type fit with the stake. It should be appreciated that the stake or stand may be in the form of other shapes, such as a shape having two, three, four, or more prongs that couple to or engage corresponding features of the decoy 400/800/900.

Figure 16:
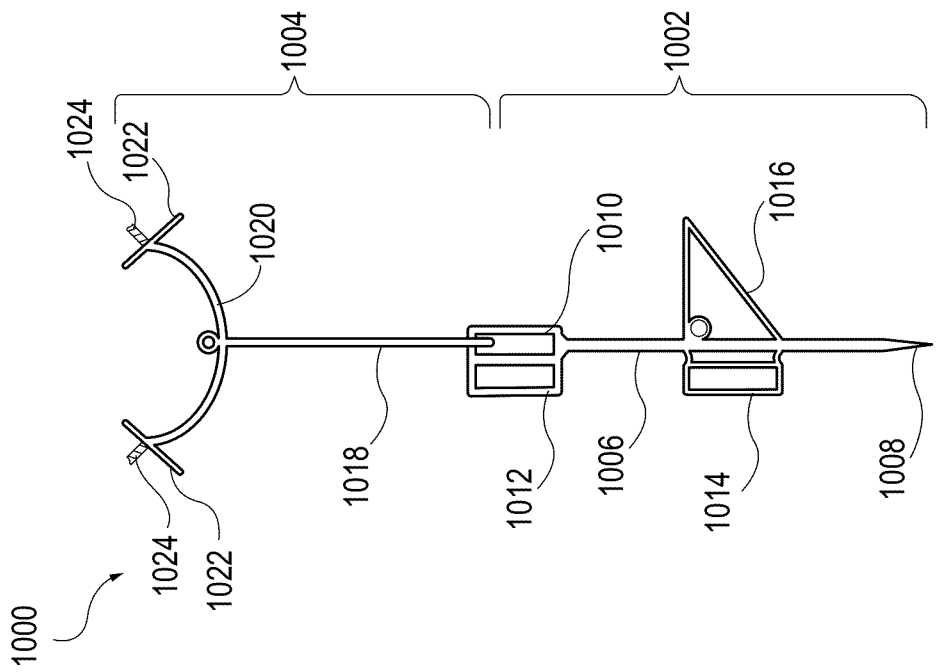
FIGS. 15 and 16 illustrate a stake or stand for a 3D article according to embodiments of the disclosure.
Figure 15:
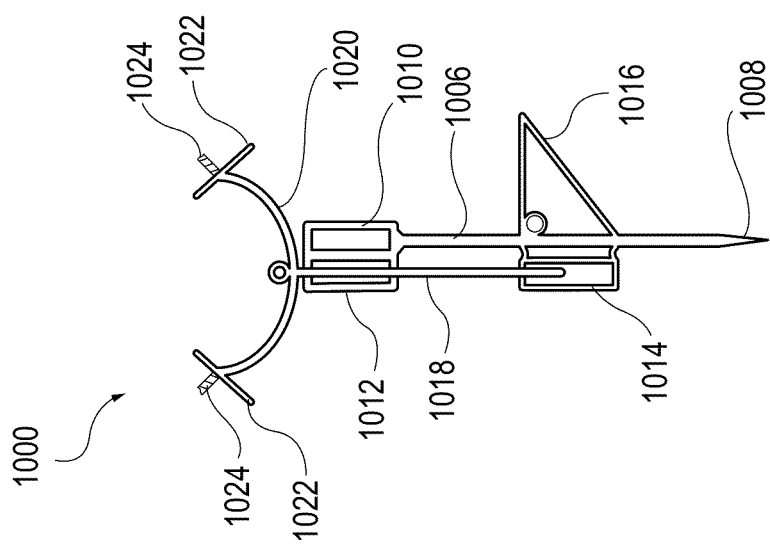

Referring to FIGS. 15 and 16 a stand 1000 is illustrated and described. The stand 1000 is in the form of a substantially "Y" shape, and has a first stand portion 1002 and a second stand portion 1004 that removably couple together in first and second configurations (a retracted configuration as illustrated in FIG. 15, and an extended configuration as illustrated in FIG. 16).

The first stand portion 1002 includes a shaft 1006 with a point 1008 on a first end of the shaft 1006, and first and second holders 1010, 1012 coupled to a second end of the shaft 1006. A third holder 1014 may also be coupled to the shaft 1006 between the first and second ends of the shaft 1006, and in alignment with the second holder 1012. A step or driving protrusion 1016 may optionally be coupled to the shaft 1006. In an example, a user may step on or otherwise apply pressure to the shaft 1006 via the driving protrusion 1016 to drive the point 1008 into a surface or the ground, such that the shaft 1006 is held upright.

The second portion 1004 includes a second shaft 1018, and a substantially "U" shaped support 1020 coupled to a first end of the second shaft 1018. Each end of the support 1020 may include a stop 1022 and a connection portion 1024 extending from the stop 1022. The connection portions 1024 are adapted to engage corresponding connection portions or apertures of the decoy 400/800/900, with the stops 1022 being disposed adjacent an outer surface of the decoy 400/800/900. In an example, the decoy 400/800/900 may include first and second connection portions or apertures respectively disposed on the first and second portions of the decoy 400/800/900 proximal to a belly or breast portion of the decoy 400/800/900. The respective connection portions 1024 may be removably coupled to the first and second connection portions of the decoy 400/800/900, for example, with the support 1020 extending transversely across the belly or breast portion of the decoy 400/800/900. Alternatively, the decoy 400/800/900 may include first and second connection portions or apertures respectively disposed longitudinally along a belly or breast portion of the decoy 400/800/900, and the respective connection portions 1024 may be removably coupled to the first and second connection portions of the decoy 400/800/900, for example, with the support 1020 extending longitudinally along the belly or breast portion of the decoy 400/800/900.

As described above, the first stand portion 1002 and the second stand portion 1004 removably couple together in first and second configurations (retracted and extended configurations). In the retracted configuration, as illustrated in FIG. 15, a second end of the second shaft 1018 is inserted through the second holder 1012 and into the third holder 1014. The second and third holders 1012, 1014 hold the second shaft 1018 in alignment with the shaft 1006, and the support 1020 is disposed proximal to the second holder 1012. In this configuration a decoy 400/800/900 coupled to the stand 1000 may be positioned lower or closer to the ground.

In the extended configuration, as illustrated in FIG. 16, a second end of the second shaft 1018 is inserted into the first holder 1010. The first holder 1010 holds the second shaft 1018 in alignment with the shaft 1006, and the support 1020 is disposed distal to the second holder 1012. In this configuration a decoy 400/800/900 coupled to the stand 1000 may be positioned higher or further away from the ground.

The removability and adjustability of the first and second portions 1002, 1004 of the stand 1000 allow the stand to be disassembled for storage or transport. The stand 1000 may also be disassembled or placed in the retracted configuration, and stored in the decoy 400/800/900. For example, as described above the decoy 400/800/900 may include an openable and closeable portion that provides access to an interior of the decoy 400/800/900. This openable and closeable portion may allow for the stand 1000 to be inserted into the interior of the decoy 400/800/900 for storage or transport.

Figure 17:
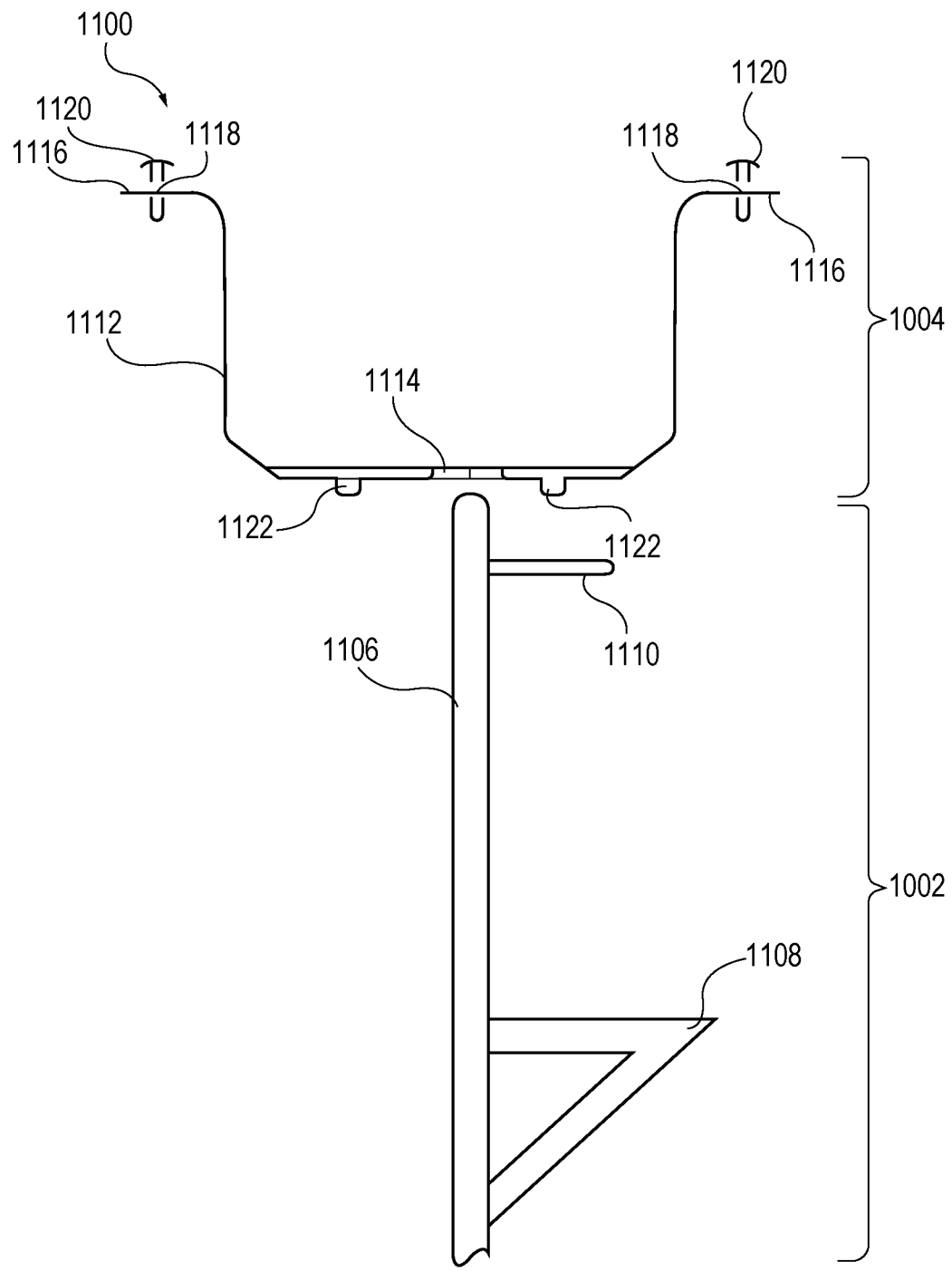
FIG. 17 illustrates another stake or stand for a 3D article according to embodiments of the disclosure.
Figure 18:
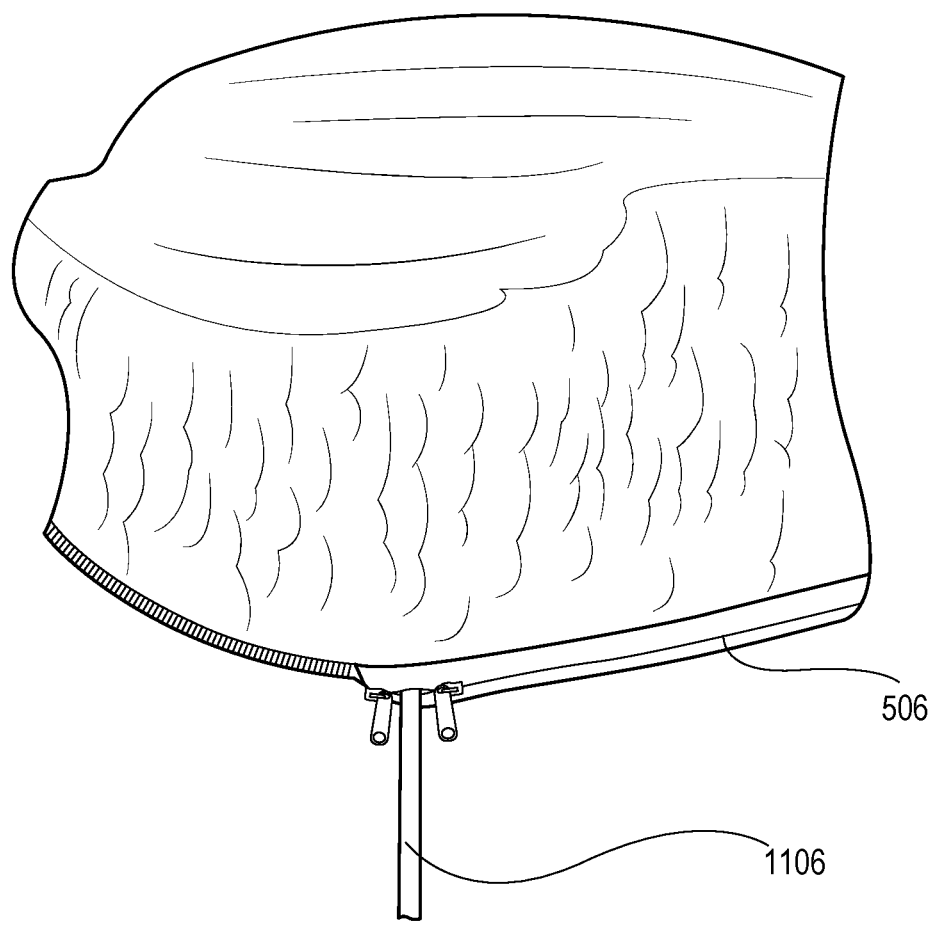
FIG. 18 illustrates the stake or stand of FIG. 17 installed in the 3D article.

In another embodiment, referring to FIGS. 17 and 18 a stand 1100 is illustrated and described. The stand 1100 is in the form of a substantially "Y" shape, and has a first stand portion 1102 and a second stand portion 1104 that removably couple together. The first stand portion 1102 includes a shaft 1106 with a point on a first end of the shaft 1106. A step or driving protrusion 1108 may optionally be coupled to the shaft 1106. In an example, a user may step on or otherwise apply pressure to the shaft 1106 via the driving protrusion 1108 to drive the shaft 1106 into a surface or the ground, such that the shaft 1106 is held upright. A stop 1110 may also be coupled to the shaft proximal to a second end of the shaft 1106.

The second portion 1104 includes a substantially "U" shaped support 1112 that removably couples to the second end of the shaft 1106, via aperture 1114. Each end of the support 1112 may include a flange 1116 including an aperture 1118. The flanges 1116 are adapted to be disposed inside the decoy 400/800/900 and coupled to the decoy 400/800/900 by fasteners 1120, with the flanges 1116 being disposed adjacent an interior surface of the decoy 400/800/900. In an example, the decoy 400/800/900 may include first and second connection portions or apertures respectively disposed on the first and second portions of the decoy 400/800/900 proximal to a top or back portion of the decoy 400/800/900. The respective fasteners 1120 may be removably coupled to the first and second connection portions of the decoy 400/800/900, for example, with the support 1112 extending transversely across the top or back portion of the decoy 400/800/900. Alternatively, the decoy 400/800/900 may include first and second connection portions or apertures respectively disposed longitudinally along a top or back portion of the decoy 400/800/900, and the support 1112 may extend longitudinally along the top or back portion of the decoy 400/800/900.

The support 1112 may also include one or more stops 1122 disposed on a base portion of the support 1112, proximal to and on opposing sides of the aperture 1114. When the shaft 1106 is disposed in the aperture 1114, the shaft 1106 and support 1112 may be rotatable with respect to one another. The stop 1110 may allow about 180 degrees of rotation, and contact either of stops 1122 to limit rotation to about 180 degrees. However, the location of the stops 1122 may be altered to provide for more or less than 180 degrees of rotation. Additionally, the first stand portion 1102 may be extendable/retractable to allow a height of the decoy 400/800/900 to be adjusted.

The support may be entirely installed inside the decoy 400/800/900 and coupled to the decoy 400/800/900 via the fasteners 1120, which may be screws, rivets, bolts, pins, etc. The second end of the shaft 1106 may be disposed in the decoy 400/800/900 and into the aperture 1114, with the stop 1110 also being disposed in the decoy 400/800/900 (for example, as illustrated in FIG. 18). During use, the openable and closeable mechanism 506 may be closed around the shaft 1106 to limit rotational movement between the shaft 1106 and support 1112.

The support 1112 may be permanently or removably coupled to the decoy 400/800/900, and may also be flexible. The flexibility of the support 1112 may allow the decoy 400/800/900 to be folded, collapsed, etc., with the support 1112 in the decoy 400/800/900.

The removability of the first portion 1102 from the second portion 1104 allows the stand 1100 to be disassembled for storage or transport. The stand 1100 may also be disassembled, and stored in the decoy 400/800/900. For example, as described above the decoy 400/800/900 may include an openable and closeable portion (such as mechanism 506) that provides access to an interior of the decoy 400/800/900. This openable and closeable portion may allow for the stand 1100 to be inserted into the interior of the decoy 400/800/900 for storage or transport.

While the 3D article is described as a turkey decoy, the 3D article may be any other type of decoy or other type of article. For example, the 3D article may be a male or female turkey, waterfowl, upland game, deer, moose, elk, coyote, predator, or any other type of decoy. The 3D article may be a component for a vehicle, a toy, exercise equipment, home or office furnishing, or any other type of article.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Moreover, it should be apparent to one skilled in the art, that the disclosure may be practiced without some or all of the specific details and steps disclosed herein.

The concepts disclosed herein may be applied within a number of different fields or areas and systems, including, for example, decoys, components for vehicles, toys, exercise equipment, home or office furnishings, and other areas that include 3D foam articles or objects, etc. The specification and drawings are, accordingly, to be regarded in an illustrative rather than a restrictive sense. It should, however, be evident that various modifications and changes may be made thereunto without departing from the broader spirit and scope of the disclosure as set forth in the claims.

What is claimed is:

1. A method of making a 3D article wherein the 3D article includes a body portion having a first portion and a second portion wherein the first portion and the second portion each comprise a laminated material, the method comprising:
coupling a printed fabric to a flat thermoformable base material to form the laminated material;
applying first registration markers to the printed fabric;
aligning the first registration markers with corresponding second registration markers of a mold;
forming the laminated material into the 3D article using the mold; and
physically coupling the first portion and the second portion together at a seam, wherein the seam includes an openable and closeable mechanism comprising a zipper, buttons, snaps, or hook and loop fastener.

2. The method of claim 1, wherein applying the first registration markers to the printed fabric includes applying the first registration markers to the printed fabric of the laminated material.

3. The method of claim 2, further comprising heating the laminated material to form a heated laminated material.

4. The method of claim 3, wherein forming the 3D article using the mold includes pressing the heated laminated material into or onto the mold using a male mold corresponding to the mold.

5. The method of claim 3, wherein forming the 3D article using the mold includes pulling the heated laminated material into or onto the mold using a vacuum.

6. The method of claim 1, wherein coupling the printed fabric to the base material includes applying an adhesive to one or more of the printed fabric and the base material.

7. The method of claim 6, wherein forming the 3D article using the mold includes pulling the printed fabric and base material into or onto the mold using a vacuum.

8. The method of claim 7, wherein forming the 3D article using the mold includes pressing the base material into the mold using a male mold corresponding to the mold.

9. A method of making a 3D article wherein the 3D article includes a body portion having a first portion and a second portion wherein the first portion and the second portion each comprise a laminated material, the method comprising:
applying first registration markers to a printed fabric;
aligning the first registration markers with corresponding second registration markers of a mold;
applying an adhesive to one or more of the printed fabric and a flat thermoformable base material to form the laminated material;
heating the laminated material;
pressing or pulling the laminated material into or onto the mold; and
physically coupling the first portion and the second portion together at a seam to form the 3D article, wherein the seam includes an openable and closeable portion comprising a zipper, buttons, snaps, or hook and loop fastener.

10. The method of claim 9, further comprising pulling the printed fabric into or onto the mold using a vacuum.

11. The method of claim 10, wherein pressing or pulling the base material into or onto the mold includes pulling the base material into the mold using the vacuum.

12. The method of claim 10, wherein pressing or pulling the base material into the mold includes pressing the base material into the mold using a male mold corresponding to the mold.

13. The method of claim 1, wherein the flat thermoformable base material is a foam.

14. The method of claim 13, wherein the flat thermoformable base material is EVA foam.

15. The method of claim 1, wherein the flat thermoformable base material is thermoplastic.

16. The method of claim 9, wherein the flat thermoformable base material is a foam.

17. The method of claim 16, wherein the flat thermoformable base material is EVA foam.

18. The method of claim 9, wherein the flat thermoformable base material is thermoplastic.

19. The method of claim 1, further comprising forming the first and second portions, each comprising the laminated material, into three dimensional first and second portions using molds prior to physically coupling the first and second portions at the seam.

20. The method of claim 9, further comprising forming the first and second portions, each comprising the laminated material, into three dimensional first and second portions using molds prior to physically coupling the first and second portions at the seam.

21. The method of claim 4, wherein the first and second portions are monolithically connected along a first section of the first and second portions before pressing the heated laminated material into the mold; and the physically coupling the first portion and the second portion together at a seam is at a second section of the first and second portions.

22. The method of claim 9, wherein the first and second portions are monolithically connected along a first section of the first and second portions before pressing or pulling the laminated material into the mold; and the physically coupling the first portion and the second portion together at a seam is at a second section of the first and second portions.

* * * * *